(12) United States Patent
Fauconnier et al.

(10) Patent No.: US 7,881,257 B2
(45) Date of Patent: Feb. 1, 2011

(54) METHOD FOR CONTROLLING COMMUNICATION CHANNELS AND BASE STATION AND TERMINAL THEREFOR

(75) Inventors: Denis Fauconnier, St-Remy-les-Chevreuse (FR); Sarah Boumendil, Paris (FR); Evelyne Le Strat, Paris (FR)

(73) Assignee: Alcatel Lucent, Paris (FR)

( * ) Notice: Subject to any disclaimer, the term of this patent is extended or adjusted under 35 U.S.C. 154(b) by 1371 days.

(21) Appl. No.: 10/500,900

(22) PCT Filed: Jan. 3, 2003

(86) PCT No.: PCT/FR03/00008

§ 371 (c)(1),
(2), (4) Date: Apr. 21, 2005

(87) PCT Pub. No.: WO03/061308

PCT Pub. Date: Jul. 24, 2003

(65) Prior Publication Data

US 2005/0176435 A1 Aug. 11, 2005

(30) Foreign Application Priority Data

Jan. 7, 2002 (FR) .................................. 02 00122

(51) Int. Cl.
*H04Q 7/00* (2006.01)
(52) U.S. Cl. ........................ 370/329; 370/330; 370/332; 370/340; 370/341; 455/422.1; 455/424
(58) Field of Classification Search ................ 370/329, 370/331, 330, 332, 340, 341; 455/422.1, 455/424
See application file for complete search history.

(56) References Cited

U.S. PATENT DOCUMENTS

| 7,123,913 | B2 * | 10/2006 | Akao et al. .................. 455/436 |
| 7,177,298 | B2 * | 2/2007 | Chillariga et al. ........... 370/348 |
| 2001/0024431 | A1 * | 9/2001 | Koo et al. .................... 370/335 |
| 2002/0034158 | A1 * | 3/2002 | Wang et al. .................. 370/203 |
| 2003/0017838 | A1 * | 1/2003 | Kayama et al. ............. 455/525 |
| 2004/0102189 | A1 * | 5/2004 | Shurvinton et al. ...... 455/422.1 |

OTHER PUBLICATIONS

ETSI TS 101 851 V1.1.1, Dec. 2000, pp. 1-17, XP002216376. << Satellite component of UMTS/IMT 2000 ; A-family; Part 1 : Physical channels and mapping of transport channels into physical channels (S-UMTS-A 25.211).

(Continued)

*Primary Examiner*—Vincent P Harper
*Assistant Examiner*—Fred A Casca
(74) *Attorney, Agent, or Firm*—Sughrue Mion, PLLC

(57) ABSTRACT

A control method allocates to a base station, at a control member of the base station, a list of channels shared by several terminals containing several sets of shared channels. For a communication session between the base station and a specific terminal, the method indicates to the terminal the list of shared channels allocated to the base station. At the base station, the method selects for the terminal one of the sets of shared channels, and independently of the control member, indicates the selected set to the terminal via a dedicated channel.

39 Claims, 9 Drawing Sheets

OTHER PUBLICATIONS

Ghosh A et al : "Shared Channels for Packet Data Transmission in W-CDMA" VTC 1999-Fall. IEEE VTS 50$^{th}$. Vehicukar Technology Conference. Gateway to the 21$^{st}$. Century Communication Village. Amsterdam, Sep. 19-22, 1999, IEEE Vehicular Technolgy Conference, New-York, NY : IEEE, US vol. 2 Conf. 50, Sep. 19, 1999, pp. 943-947, XP001001484 ISBN: 0-7803-5436-2.

TS 25.212, version 3.7.0 published in Sep. 2001 by the 3GPP.
TS 25.308, version 5.0.0, published in Sep. 2001 by the 3GPP.
TS 25.433, Version 4.2.0, published in Sep. 2001, by the 3GPP.
TS 25.331, Version 4.2.1, published in Sep. 2001, by the 3GPP.
TR 25.870, Version 1.1.0, published in Nov. 2001 by the 3GPP.

* cited by examiner

| SLOT No.<br>FRAME No. | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | 0/13 | | | 3 | | | 6 | | | 9 | | | 12 | | |
| 1 | 3/1 | | | 6 | | | 9 | | | 12 | | | 0 | | |
| 2 | 6/4 | | | 9 | | | 12 | | | 0 | | | 3 | | |
| 3 | 9/7 | | | 12 | | | 0 | | | 3 | | | 6 | | |

FIG.9

METHOD FOR CONTROLLING COMMUNICATION CHANNELS AND BASE STATION AND TERMINAL THEREFOR

BACKGROUND FO THE INVENTION

The present invention relates to the control of communication channels in a communication system comprising a base station and several terminals. It has a particular, non-exclusive, application in cellular networks for radio communication with mobiles.

In communication systems, it is conventional to manage the allocation of channels by way of a control facility. The latter is in fact furnished with a set of communication resources that it can distribute at its convenience, for example upon a traffic channel request by a user.

The control facility therefore makes communication channels available to a base station so that the latter can communicate with terminals under its zone of coverage. The control facility and the terminal converse according to a resource management protocol, transparent to the base station, in particular so that the terminal is informed of the channels to be used, in the form of a subset of the communication channels allocated to the base station.

Such management of the communication channels exhibits some rigidity since it necessitates systematic intervention from the control facility in case of reallocation of the communication channels, if for example one wishes to use, for a terminal, channels that have not been assigned to it specifically at the start of its communication session with a base station. Now, there are various circumstances where a reassignment of resources may seem to be desirable at the base station level without it being opportune to advise the control facility thereof, for example for reasons of management of the hardware and/or software resources within the base station or else because the delay occasioned by the exchange with the control facility is not acceptable having regard to the characteristics of the service.

In certain cases, the control facility allocates the base station a set of channels without signaling them especially to the terminal. When the base station needs to communicate with the terminal, it selects one of these channels and indicates it to the terminal, for example on one or more associated signaling channels. Such a procedure is well suited to the implementation of fast communication services over traffic channels shared between several terminals. The associated signaling channels are also shared channels. The terminal must then know the associated signaling channel or channels that it may have to listen to. If these channels are assigned to it by the control facility, the above problem arises again each time the need appears, at the base station level, to reassign the shared signaling channels used for a given terminal.

Another possibility of letting the terminal know the shared channel or channels to be used consists of a fast signaling mechanism, for example one using symbol stealing, over a dedicated communication channel set up with the terminal. However, this may result in an undesirable reduction in the bandwidth afforded by this dedicated channel, in particular if the list of possible channels is relatively extensive or unknown a priori to the terminal.

An object of the present invention is to improve the flexibility of these methods of managing shared communication channels.

SUMMARY OF THE INVENTION

The invention thus proposes a method of controlling communication channels between a base station and terminals, including channels that are shared by the terminals so as to communicate with said base station and at least one channel of the base station that is dedicated to one of the terminals. The method comprises the following steps:

allocating a list of shared channels, which list is composed of several sets of shared channels, to the base station;

for a communication session between the base station and said terminal, indicating to the terminal, from a control facility, the list of shared channels that is allocated to the base station; and at the base station level, selecting for the terminal one of the sets of shared channels and, independently of the control facility, indicating the selected set to the terminal by way of said dedicated channel.

A dynamic choice of the channels to be used for a terminal is therefore made in a quasi-autonomous manner by the base station without intervention from the control facility. To make this choice, the base station is not constrained by an assignment of channels that would have been performed specially for the terminal. This results in greater flexibility in the management of the shared channels, which allows optimal use of the available resources.

The control facility merely signals to the terminal the list allocated to the base station, when setting up the communication session or during a reconfiguration of this session. It does not have to intervene when the base station dynamically modifies its selection from the list which was allocated to it.

The choice of the communication channels to be used by the terminal can depend on a shareout of processing resources in the base station. In particular, if the base station possesses a modular architecture, each set of communication channels allocated to a terminal can be processed by a given module.

The shared communication channels may be signaling channels or traffic channels. In the case of signaling channels, they can contain information allowing a terminal to read a shared traffic channel.

The indication of the communication channels to be used by the terminal can advantageously be transmitted to it by inserting this item of information into the data stream dispatched to it over a dedicated communication channel. This insertion can be carried out by stealing symbols from the stream sent. In this way, the transmission of the information does not require the introduction of new communication resources specific to this use.

In the case where one wishes to transmit this item of information with low periodicity, and possibly with some redundancy, so as to increase the reliability of its receipt by the terminal, care must be taken that the stealing of symbols does not turn out to be detrimental to the decoding performance in respect of the information received on account of an interleaving of the data transmitted. It is therefore possible to vary the position of the stolen symbols so as to avoid clusters of symbols empty of information during the decoding performed by the terminal.

If another item of information, such as an indication of a channel from among the set selected that the terminal must decode, forms the subject of a stealing of symbols on the dedicated channel, the position of the symbols stolen to indicate the selected set to the terminal, must preferably be effected aptly with this other stealing of symbols.

The invention also proposes a base station for a system for communicating with terminals, comprising:
- means for obtaining, in conjunction with a control facility, a list of shared channels that is allocated to the base station and is composed of several sets of shared channels;
- means for selecting, for one of the terminals, one of the sets of shared channels; and
- means for indicating to said terminal by way of a dedicated channel, independently of the control facility, which set is selected from the list allocated to the base station.

Finally, the invention proposes a terminal for a communication system comprising at least one base station and a control facility and using channels shared with other terminals to communicate with the base station and at least one dedicated channel from the base station to said terminal. This terminal according to the invention comprises:
- means for receiving from the control facility a list of shared channels that is allocated to the base station, and is composed of several sets of shared channels, for a communication session with the base station; and
- means for receiving from the base station, by way of said dedicated channel, an indication of one of the sets of shared channels that is selected by the base station for said terminal.

BRIEF DESCRIPTION OF THE DRAWINGS

FIG. 9 is an example of symbol stealing implemented in an embodiment of the invention.

DESCRIPTION OF PREFERRED EMBODIMENTS

In the present description, the invention will be described more particularly in its nonlimiting application to third-generation radio communication networks of the UMTS type ("Universal Mobile Telecommunication System") in FDD ("Frequency Division Duplex") mode.

UMTS is a radio communication system using Code-Division Multiple Access (CDMA), that is to say the symbols transmitted are multiplied by spreading codes consisting of samples known as "chips" whose rate (3.84 Mchip/s in the case of UMTS) is greater than that of the symbols transmitted. The spreading codes distinguish between various physical channels PhCH which are superimposed on the same transmission resource constituted by carrier frequency. The auto- and cross-correlation properties of the spreading codes enable the receiver to separate the PhCHs and to extract the symbols intended for it. For UMTS in FDD mode on the downlink, a scrambling code is allocated to each base station, and various physical channels used by this base station are distinguished by mutually orthogonal "channelization" codes. For each PhCH, the global spreading code is the product of the "channelization" code and the scrambling code of the base station. The spreading factor (equal to the ratio of the chip rate to the symbol rate) is a power of 2 lying between 4 and 512. This factor is chosen as a function of the bit rate of the symbols to be transmitted on the PhCH.

Figure 1:
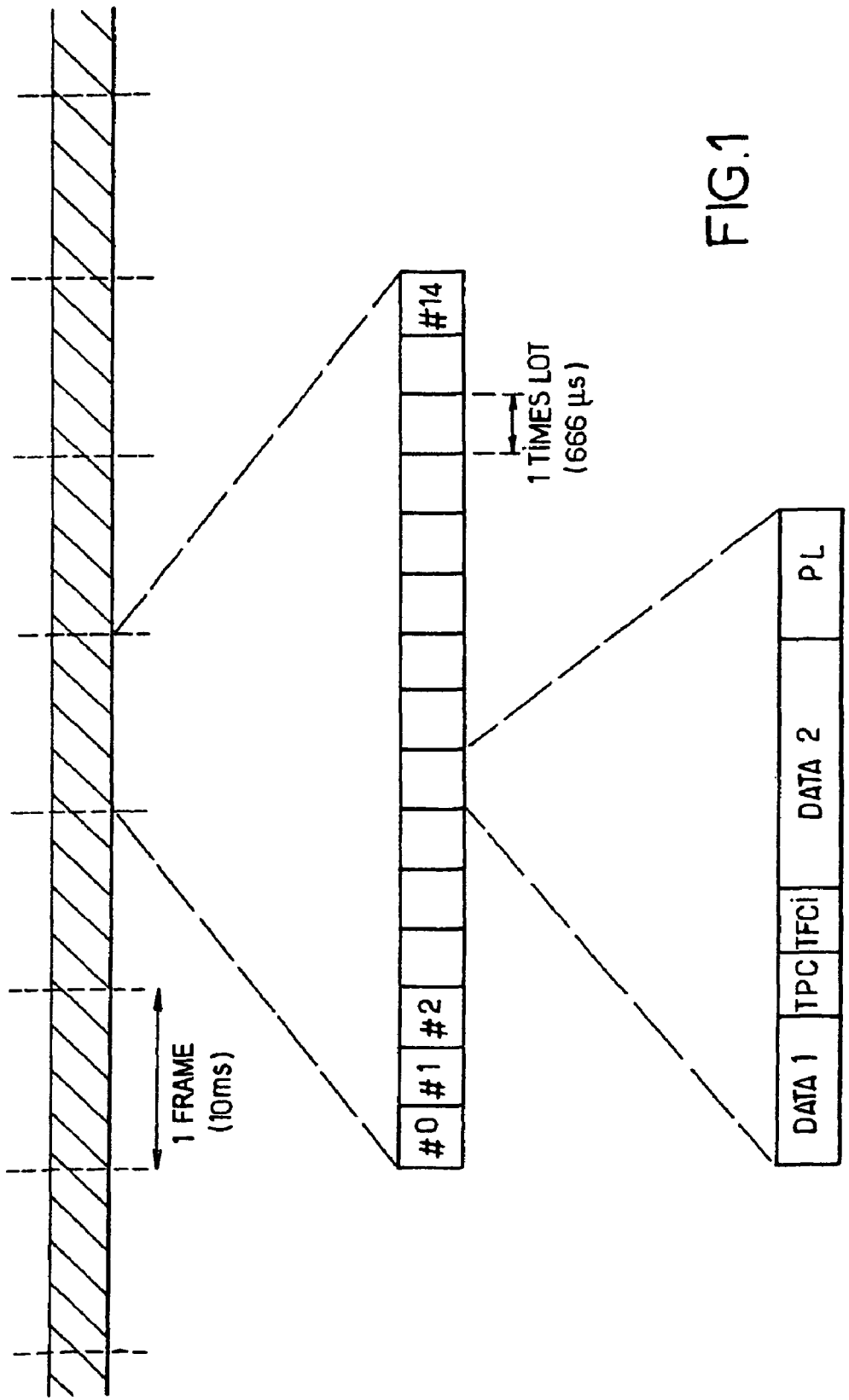
FIG. 1 is a diagram illustrating the frame structure employed on the downlinks in the UMTS system in FDD mode.

The various physical channels obey a frame structure illustrated in FIG. 1. The 10 ms frames follow one another on the carrier frequency used by the base station. Each frame is subdivided into N=15 time slots of 666 μs. Each slot can carry the superimposed contributions of one or more physical channels, comprising common channels and dedicated channels DPCH ("Dedicated Physical CHannel"). The lower chart of FIG. 1 illustrates the contribution of a downlink DPCH at a time slot in FDD mode, which comprises:
- a certain number of pilot symbols PL. Known a priori to the terminal, these symbols PL enable it to acquire the synchronization and to estimate parameters which are useful in demodulating the signal;
- a Transport Format Combination Indicator TFCI;
- a Transmit Power Control TPC to be used by the terminal on the uplink; and
- two data fields, denoted DATA1 and DATA2, placed either side of the TPC field.

The DPCH can thus be seen as amalgamating a physical channel dedicated to control, or DPCCH ("Dedicated Physical Control CHannel"), corresponding to the fields TFCI, TPC and PL, and a physical channel dedicated to the data, or DPDCH. ("Dedicated Physical Data CHannel"), corresponding to the fields DATA1 and DATA2.

The modulation used on the DPCH channels is a Quadrature Phase Shift Keying (QPSK) modulation. The symbol sequences submitted to the modulator are therefore composed of quaternary symbols each consisting of the assemblage of two bits.

For one and the same communication, it is possible to establish several DPCHs corresponding to different "channelization" codes, whose spreading factors may be equal or different. This situation is encountered in particular when a DPDCH is insufficient to provide the transmission bit rate required by the application. In what follows, Y will denote the number, equal to or greater than 1, of downlink physical channels used for one and the same communication from a base station.

Moreover, this same communication can use one or more transport channels TrCH. Multiplexed TrCHs are typically used for multimedia transmissions, in which signals of different natures to be transmitted simultaneously require different transport characteristics, in particular as regards protection against transmission errors. On the other hand, certain coders may output, in order to represent a given signal (audio for example), several streams of symbols having different perceptual importances and therefore requiring different degrees of protection. Multiple TrCHs are then used to transport these various symbol streams. In what follows, X will denote the number, equal to or greater than 1, of transport channels used for a given communication on the aforesaid Y physical channels.

For each transport channel i ($1 \leq i \leq X$), there is defined a transmission time interval TTI composed of $F_i$ consecutive frames, with $F_i$=1, 2, 4 or 8. Typically, the shorter the delay with which the signal conveyed by the transport channel must be received, the shorter the TTI used. For example, a TTI of 20 ms ($F_i$=2) will be used for a telephony application, while a TTI of 80 ms ($F_i$=8) may be used for a data transmission application.

The multiplexing of the X streams of information symbols emanating from the TrCHs on the Y PhCHs is described in detail in the technical specification 3G TS 25.212, "Multiplexing and channel coding (FDD), Release 1999", version 3.7.0 published in Sep. 2001 by the 3GPP (3$^{rd}$ Generation Partnership Project).

Figure 2:
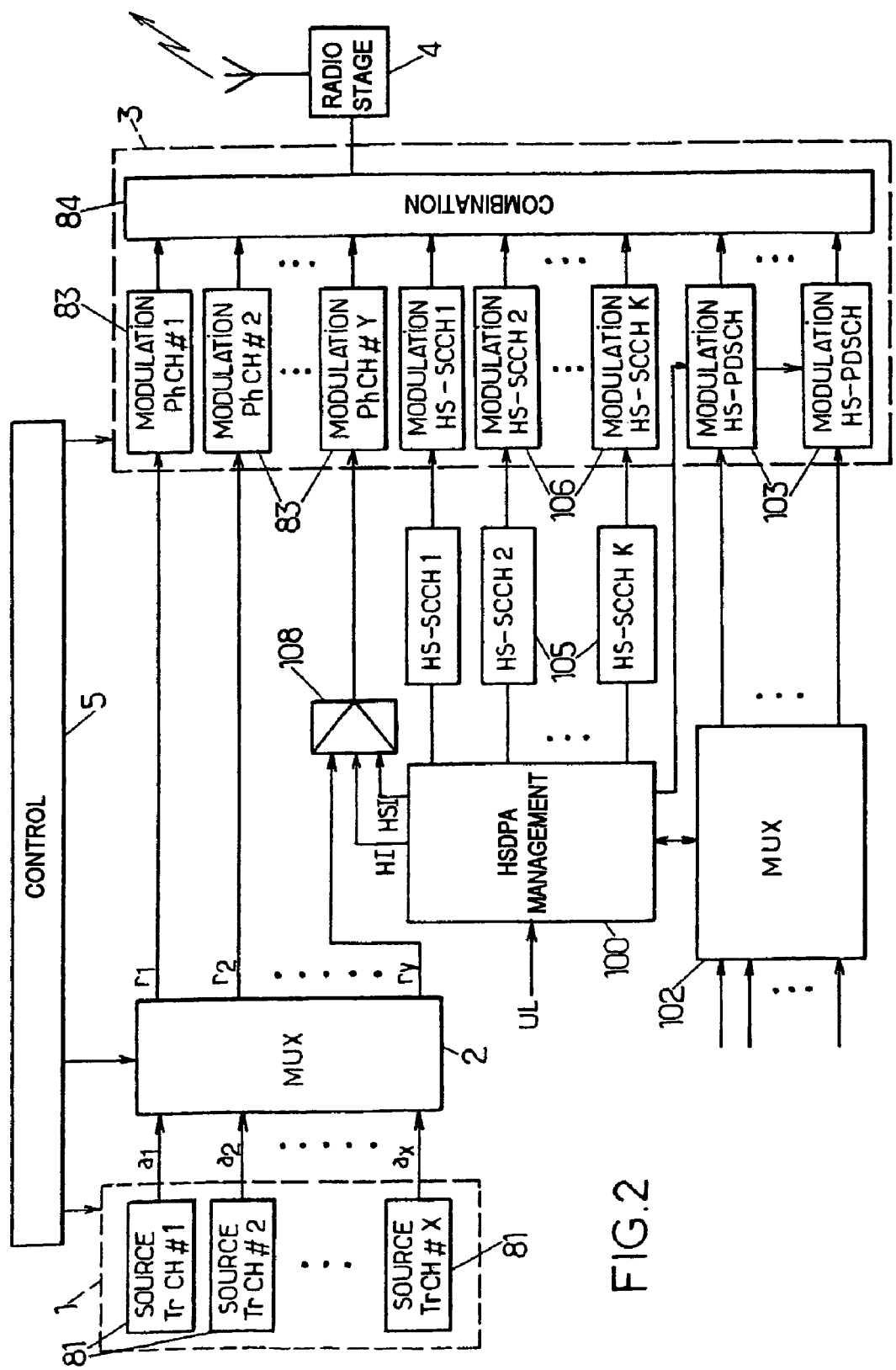
FIGS. 2 and 3 are schematic diagrams of a base station and of a UMTS terminal.

FIG. 2 diagrammatically illustrates the sending part of a UMTS base station operating in FDD mode. Block 1 denotes the set of sources 81 respectively outputting streams of information symbols $a_i$ (1≦i≦X) in relation to the X TrCHs used in a communication on dedicated resources between the base station and a terminal.

Block 2 multiplexes the streams $a_i$ to form what is referred to as a Coded Composite Transport Channel, or CCTrCH, which is subsequently subdivided into one or more physical channels PhCH#j (1≦j≦Y) on which synchronized streams of symbols respectively denoted $r_j$ are transmitted.

Block 3 designates the circuits which modulate the streams $r_j$ and combine them to form a signal processed by the radio stage 4 before being sent over the air interface. Block 3 caters for the spreading, by the "channelization" codes assigned to the PhCHs, of each of the streams $r_j$ (modules 83), as well as of any additional streams which may be output in respect of other communications supported at the same moment by the base station, the various streams of symbols thus spread being subsequently summed and then multiplied by the scrambling code of the base station (module 84). The sequencing and parameterization of blocks 1, 2, 3 is catered for by a control unit 5 in accordance with the parameters defined for the base station and for the communication under consideration.

Figure 3:
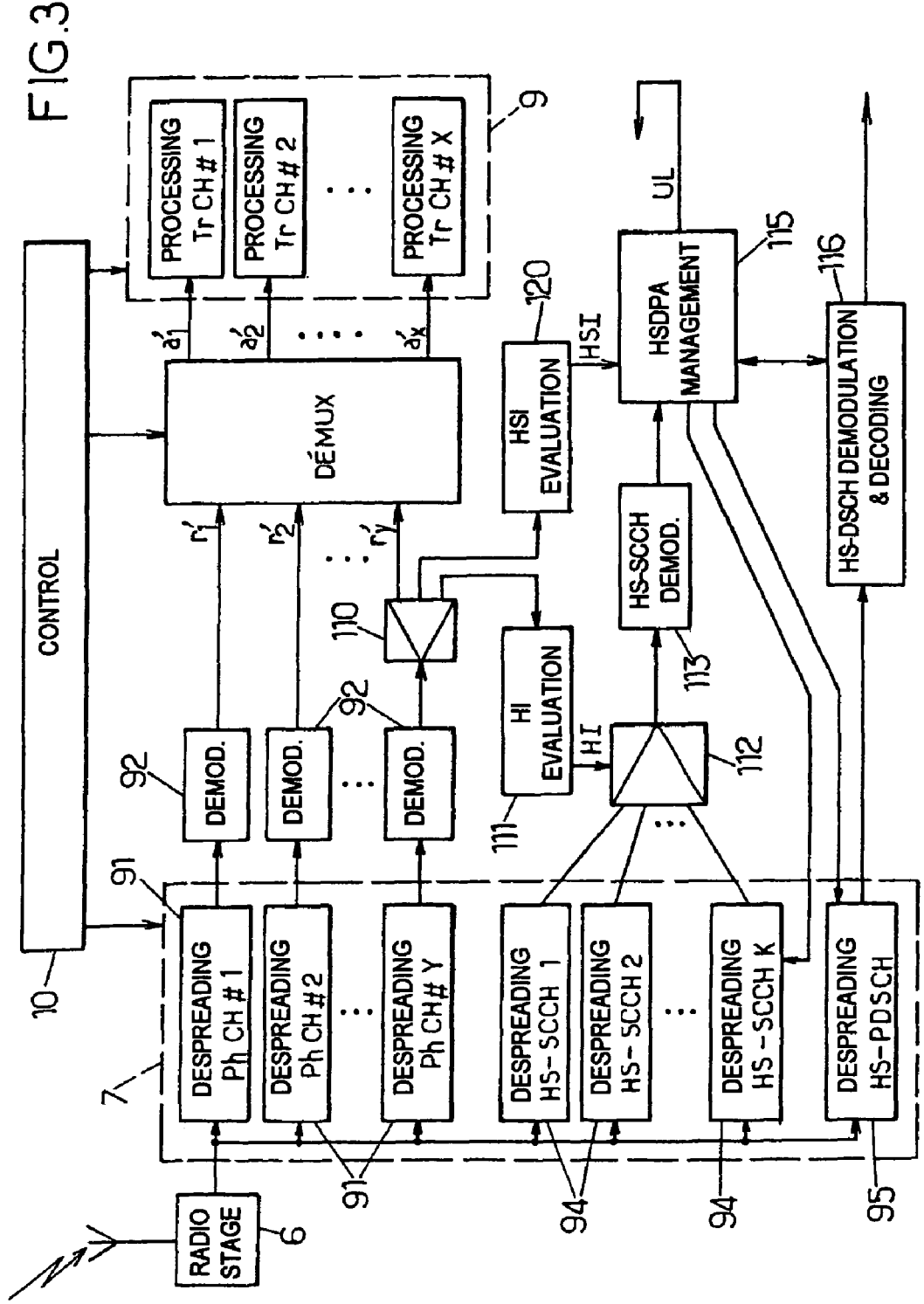

FIG. 3 diagrammatically illustrates the receiving part of a UMTS terminal communicating in FDD mode with a base station according to FIG. 2. Block 7 comprises modules 91 (matched filters) for despreading the baseband signal restored by the radio stage 6 from the signal picked up by the antenna of the terminal, using the scrambling code of the base station and the respective Y "channelization" codes assigned to the terminal. For each of the Y physical channels j (1≦j≦Y), a module 92 demodulates the despread signal so as to deliver respective data $r'_j$ representing estimates of the symbols of the stream $r_j$ formed at base station level.

In the case where the symbols are bits, the estimates $r'_j$ are "softbits", that is to say numerical values whose sign characterizes the estimated bit and whose absolute value represents the likelihood of this estimate.

The Y data streams $r'_j$ are delivered to a demultiplexing block 8 which performs the operations inverse to those of the multiplexer 2 of the base station. This block 8 outputs for each transport channel i (1≦i≦X) a stream $a'_i$ of estimates (softbits or hardbits) of the symbols of the stream $a_i$.

These estimates $a'_i$ are delivered to the processing circuit of the TrCH i belonging to the block 9. The sequencing and parameterization of blocks 7, 8, 9 is catered for by a control unit 10 of the terminal.

As is usual in the field of digital radiocommunications, the blocks 1-3,5 of the base station and 7-10 of the terminal can be embodied by programming one or more digital signal processors and/or by using specific logic circuits.

Figure 4:
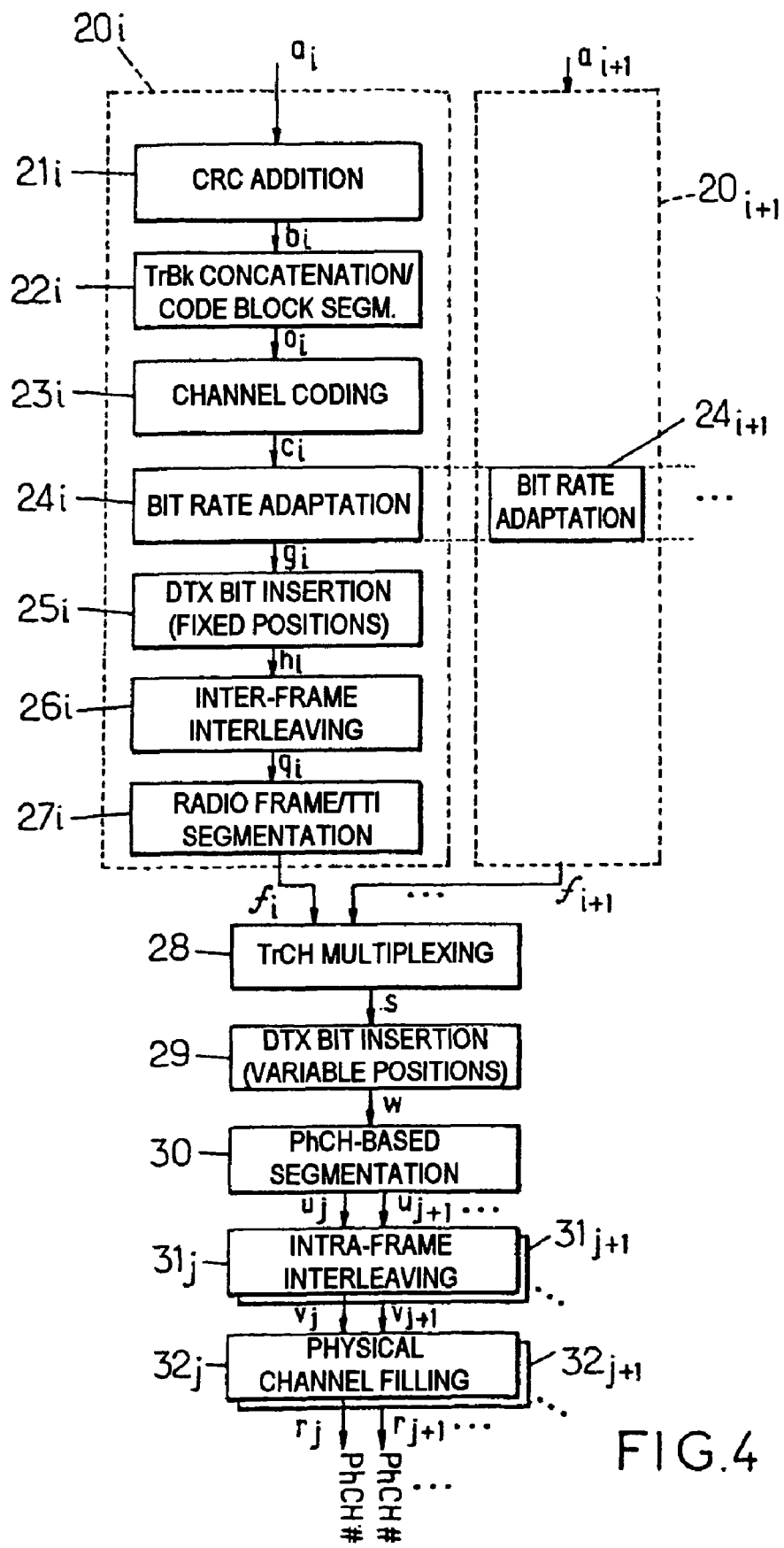
FIGS. 4 and 5 are schematic diagrams of the multiplexing and demultiplexing blocks of the base station and of the terminal according to FIGS. 2 and 3.
Figure 5:
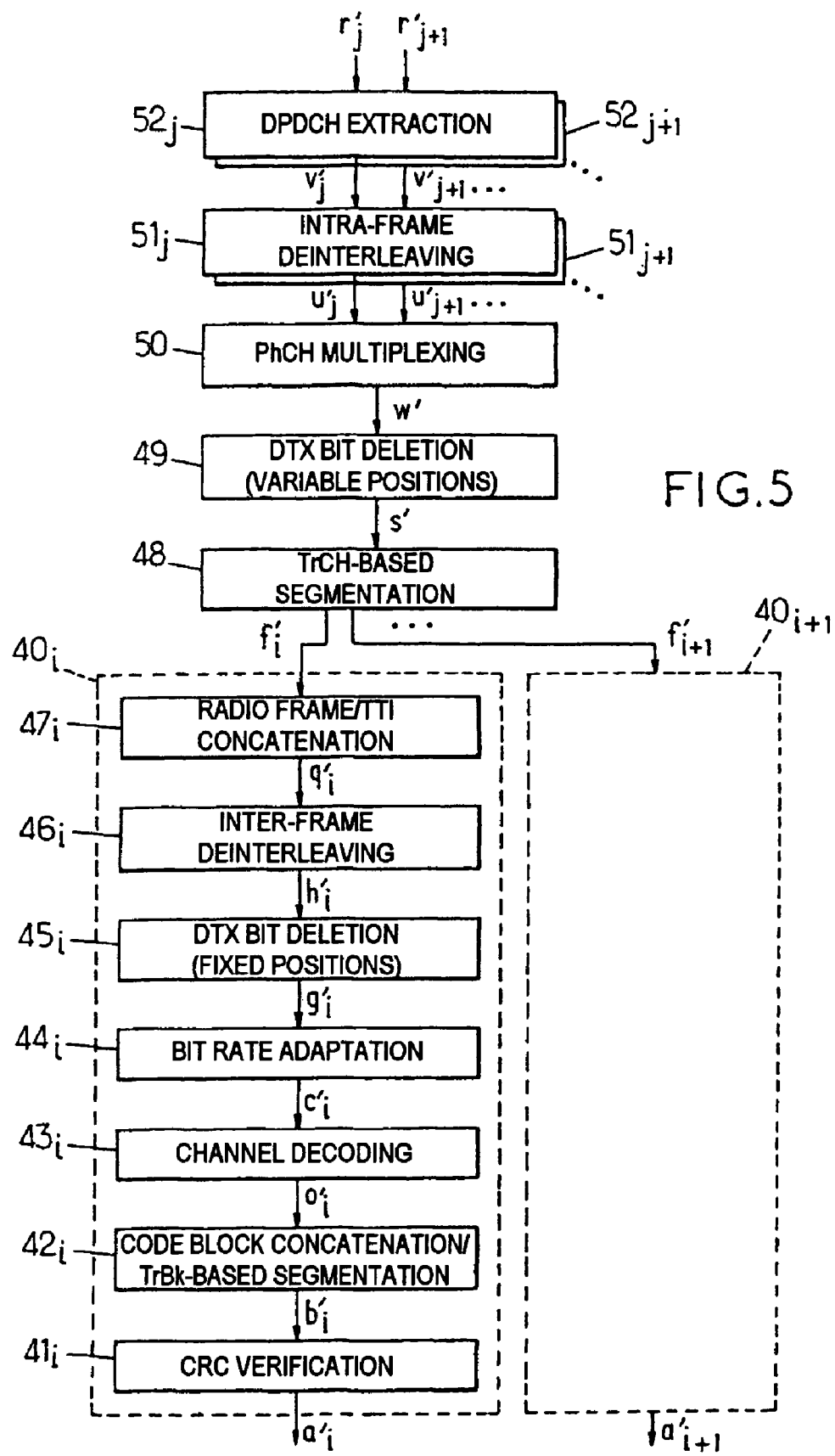

FIGS. 4 and 5 respectively detail the various functional modules of the multiplexing block 2 and demultiplexing block 8 (see the aforesaid specification 3G TS 25.212). In these figures, the references bearing the index i (1≦i≦X) designate the elements referring to TrCH i (blocks $20_i$ and $40_i$), the references bearing the index j designating the elements referring to PhCH j (1≦j≦Y), and the references with no index referring to the operations performed for each frame at CCTrCH level.

The stream $a_i$ to be transmitted on each TRCH i is composed of binary symbols output in the form of successive Transport Blocks TrBk. The module $21_i$ completes each TrBk by adding thereto a cyclic redundancy code CRC, serving to detect any transmission errors. The TrBk $b_i$ are then concatenated and/or segmented by the module $22_i$ so as to form blocks $o_i$ of appropriate size for the input of the channel coder $23_i$.

For each TTI of transport channel i, the channel coder $23_i$ outputs a sequence $c_i$ of $E_i$ coded bits denoted $c_{i,m}$ (1≦m≦$E_i$). Two types of error correcting code may be applied by the module $23_i$:

a convolutional code of rate ½ or ⅓ and of constraint length K=9;

a turbo code of rate ⅓ for the applications which require the lowest error rates. In this case, the bits $c_{i, 3p+q}$ of the output sequence from the coder are systematic bits (copies of the input blocks $o_i$) if q=1, and parity bits if q=2 or 0.

The bit rate matching modules $24_i$ delete (puncture) or repeat bits of the sequences $c_i$ so as to match the bit rate of the TrCHs to the global bit rate allowable on the PhCH or PhCHs given their spreading factors. For each TTI on TrCH i, there is defined, from the information provided by the higher protocol layers, a parameter $\Delta N_i^{TTI}$, negative in the case of puncturing and positive in the case of repetition. The sequence $g_i$ produced by the module $24_i$ for the TTI is composed of $G_i=E_i+\Delta N_i^{TTI}$ bits denoted $g_{i,n}$ (1≦n≦$G_i$). In the case where the module $23_i$ has used a turbo code, the puncturing applied by the module $24_i$ if $\Delta N_i^{TTI}<0$ is limited to the parity bits, given the greater importance of the systematic bits to the decoder.

In a given frame, the periods devoted to the various TrCHs of the communication may have fixed positions (before the intra-frame interleaving mentioned below) or variable positions. In the case of fixed positions, it may be necessary to append to the sequence $g_i$, by means of the module $25_i$, one or more marked symbols which will not be transmitted (the value of the corresponding bit will for example be set to zero instead of ±1 in the output stream $r_j$ comprising such a symbol so that the transmission power of the symbol is zero). The DTX ("Discontinuous Transmission") bits thus marked are denoted "δ". In the exemplary implementation considered here in a nonlimiting manner, each symbol $h_{i,n}$ of the sequence $h_i$ output by the module $25_i$ (0≦n≦$F_i.H_i$, with $G_i$≦$F_i.H_i$) is represented by two bits:

$h_{i,n}$=(0, $g_{i,n}$) if n≦$G_i$;

$h_{i,n}$=(1, 0) if $G_i$<n≦$F_i.H_i$ (marked bits "δ").

The interleaving module $26_i$ performs a permutation of the sequence $h_i$, with a view to distributing the symbols pertaining to the TTI over the $F_i$ frames which it covers. This inter-frame interleaving (if $F_i$>1) consists in writing the symbols of the sequence $h_i$ successively into the rows of a matrix comprising $F_i$ columns, in permuting the columns of the matrix, and then in reading the symbols of the matrix column by column to form the sequence denoted $q_i$. The module $27_i$ then chops the sequence $q_i$ into $F_i$ segments of consecutive symbols corresponding to the $F_i$ columns of the interleaving matrix after permutation, and respectively assigns these segments to the $F_i$ frames of the TTI to form a sequence denoted $f_i$ for each frame and each TrCH i (1≦i≦X).

In accordance with the specification 3G TS 25.212, the permutation of columns performed by the inter-frame interleaver $26_i$ is such that the n-th symbol $h_{i,n}$ of the TTI, with n=(α−1).$F_i$+β, α and β being integers such that 1≦α≦R1 and $1 \leq \beta \leq F_i$, is at the α-th position in the γ-th frame of the TTI, i.e.:

$$h_{i,n} = q_{i,n'}$$

with $$n' = (\gamma - 1).R1 + \alpha$$

where R1 denotes the smallest integer such that R1×$F_i$ is at least equal to the number $X_i$ of bits of the current frame ($X_i \leq R1 \times F_i$), and γ is a frame index defined by the integer β according to the permutation: $\gamma - 1 = BR(n-1, F_i) = BR(\beta - 1, F_i)$. The number BR (x, $2^y$) is here defined as the integer whose representation to the base 2 corresponds to the reading in the reverse direction of the representation to the base 2 on y digits of the remainder from the Euclidean division of x by $2^y$ (for example BR(51, 8)=BR(3, 8)=BR($[011]_2$, $2^3$)= $[110]_2$=6).

The sequences $f_i$ produced for the various TrCHs of the communication ($1 \leq i \leq X$) are multiplexed, that is to say placed one after the other, by a module 28 forming a sequence s of S symbols for the CCTrCH. In the case where the periods devoted to the various TrCHs of the communication have variable positions, it may be necessary to append to the sequence s, by means of the module 29, one or more marked symbols "δ". In the exemplary implementation considered here, each symbol $w_k$ of the sequence w output by the module 29

$$(1 \leq k \leq \sum_{j=1}^{Y} U_j,$$

with $$S \leq \sum_{j=1}^{Y} U_j$$

and $U_j$ equal to the number of bits per frame on the DPDCH of physical channel j, which number depends on the spreading factor allocated to the channel) is represented by two bits:

$w_k = (0, s_k)$ if $k \leq S$;

$$-w_k = (1, 0) \text{ if } S < k \leq \sum_{j=1}^{Y} U_j.$$

The module 30 subsequently chops the sequence w into Y segments of $U_1, U_2, \ldots, U_Y$ consecutive symbols, and respectively assigns these segments to the Y PhCHs to form a sequence denoted $u_j$ for each PhCH j ($1 \leq j \leq Y$). The interleaving module $31_j$ performs a permutation of the sequence $u_j$, with a view to distributing the symbols, within the current frame, over the Y PhCHs employed by the communication. This interleaving consists in writing the symbols of the sequence $u_j$ successively to the rows of a matrix comprising C2=2×N=30 columns, in permuting the columns of the matrix, and in then reading the symbols of the matrix column by column to form the sequence, denoted $v_j$, of $U_j$ symbols.

The module $32_j$ for mapping the physical channel finally distributes the successive symbols of the sequence $v_j$ into the fields DATA1 and DATA2 of the time slots of the current frame. The module $32_j$ can translate the information bits with values 0 or 1 into signed bits (±1), and assign the value 0 to the marked bits "δ".

It furthermore supplements the stream $r_j$ addressed to the block 3 by inserting the appropriate signalling bits into the fields PL, TFCI and TPC of the DPCCH.

In accordance with the 3G TS 25.212 specification, if R2 denotes the smallest integer such that R2×C2 is at least equal to the number $U_j$ of bits of the current frame ($U_j \leq R2 \times C2$), the permutation of the columns performed by the intra-frame interleaver $31_j$ is such that the n-th symbol $u_{j,n}$ of the current frame, with $n = (\alpha - 1).C2 + \beta$, α and β being integers such that $1 \leq \alpha \leq R2$ and $1 \leq \beta \leq C2 = 2 \times N$, lies in the (ε.R2+α)-th position in a γ-th time slot of the frame, i.e.

$$u_{j,n} = v_{j,n'}$$

with $$n' = 2.(\gamma - 1).R2 + \epsilon.R2 + \alpha \quad (2)$$

where $\epsilon = 0$ or 1 and 2. ($\gamma - 1$)+ε is an integer obtained as a function of β−1 through a determined permutation perm$_{C2}$ on the integers lying between 0 and C2−1: 2. ($\gamma - 1$)+ε= perm$_{C2}$(β−1).

The demultiplexing block 8 of the terminal comprises modules which perform, in the reverse direction, the operations which are dual to those of the modules $20_i$-$32_j$ of the multiplexing block 2 of the base station. In FIG. 5, the primed references correspond to the estimates of the symbols bearing the same unprimed references in FIG. 4. For the symbols composed of two bits formatted as indicated hereinabove by reason of the marking of the bits "δ", these estimates (softbits) refer to the least significant bit.

For each 10 ms frame and each PhCH, the module $52_j$ extracts the sequence $v'_j$ of $U_j$ softbits pertaining to the DPDCH from the fields DATA1 and DATA2 of the demodulated signal. The deinterleaving module $51_j$ applies the inverse permutation to that of the module $31_j$ to this sequence $v'_j$ so as to restore the sequence of softbits $u'_j$. The Y sequences $u'_j$ are placed end to end by the multiplexing module 50 so as to form the sequence of softbits w' which relates to the CCTrCH. In the case where the TrCHs have variable positions, the module 49 deletes the last $$\sum_{j=1}^{Y} U_j - S$$

softbits of the sequence w', which correspond to "δ" bits. The softbit sequence s' produced by the module 49 is chopped by the segmentation module 49 into X subsequences $f'_i$ respectively assigned to the TrCHs.

For each TrCH i whose TTI comprises several frames ($F_i > 1$), the module $47_i$ concatenates the subsequences produced in relation to the various frames so as to form the sequence $q'_i$ subjected to the inter-frame deinterleaving module $46_i$. The latter carries out the permutation inverse to that of the module $26_i$ so as to restore the sequence of softbits $h'_i$. In the case where the TrCHs have fixed positions, the module $45_i$ deletes the $F_i.H_i-G_i$ last softbits of the sequence $h'_i$, which correspond to "δ" bits. The sequence of softbits s' produced by the module 49 is then processed by the bit rate matching module $44_i$ which performs the following operations:

insertion of a null softbit (minimum likelihood) in place of each bit which has been punctured on transmission;

reevaluation of each softbit corresponding to a bit which has been repeated on transmission, so as to sharpen the likelihood thereof.

The output sequence $c'_i$ of the module $44_i$ is decoded by the module $43_i$ so as to correct any transmission errors. The symbols of the decoded blocks $o'_i$ output by the module $43_i$ can be softbits, or hardbits if the likelihood measures are no longer required in the subsequent processings. On the basis of these blocks $o'_i$, the module $42_i$ reconstructs the estimated TrBk $b'_i$, and the module $41_i$ verifies the integrity of the CRC so as to validate these TrBk in the output stream $a'_i$ relating to TrCH i.

Henceforth, we deal with a particular non-restrictive embodiment of the invention related to the HSDPA ("High Speed Downlink Packet Access") functionality. An overall description of this functionality can be found in TS 25.308 technical specification, Release 5, version 5.0.0, published in Sep. 2001 by the 3GPP.

The HSDPA allows the transmission by a base station of data at high bit rate for a set of mobile stations situated in the zone of coverage of the base station. It relies on a high bit rate shared transport down channel: the HS-DSCH ("High speed—Downlink Shared Channel"). In the FDD mode with which the present description is more particularly concerned, this channel has in particular as characteristics: (i) a transmission time interval (TTI) of 2 milliseconds corresponding to 3 time slots of 666 μs; (ii) HARQ ("Hybrid Automatic Repeat reQuest") type data retransmission request hybrid processes; and (iii) an adaptive coding and modulation mechanism. At the access level network, a specific layer of the Medium Access Control (MAC) protocol is located in the base station. Thus, one arranges to offer a maximum bit rate on this channel. For the same reason, the HS-DSCH uses a relatively low spreading factor, equal to 16. In a given cell and for a given scrambling code, it is possible for up to 15 HS-DSCH channels to be set up using orthogonal "channelization" codes.

For an HS-DSCH channel, there must be provision for one or more specific shared physical control channels called HS-SCCH ("High Speed—Shared Control CHannel") or SCCH-HS. The signaling information carried by the HS-SCCHs identifies the destination terminals from the blocks transmitted on the HS-DSCHs, and provide them with a certain number of indications useful for the reception of these blocks:

a Transport Format and Resource Indicator (TFRI) giving the information relating to the format of the dynamic part of the HS-DSCH channel, in particular for the modulation scheme employed, and the physical resources allocated ("channelization" codes);
  the information related to the HARQ protocol, in particular the redundancy version, an HARQ process identifier, and a new data blocks indicator.

An HS-SCCH channel uses a spreading factor of 128, with a TTI identical to that of the HS-DSCH (3 slots of 666 μs). All the HS-PDSCHs (that is to say the physical channels arising from the HS-DSCHs) within a cell are aligned timewise and the synchronization of the HS-SCCHs is advanced by two slots (1333 μs) with respect to that of the associated HS-PDSCHs, thereby allowing the destination terminal for a data block transmitted on an HS-PDSCH in an HSDPA TTI of 2 ms to know the information necessary for its receipt. Certain information contained in the TFRI, namely the allocated codes as well as the modulation used, are paramount for the terminals since it allows them to start demodulating the HS-PDSCH(s) relating to them. This is why this information of the TFRI is included in the first slot of each TTI on the HS-SCCH. Thus, a fast decoding of the HS-SCCH allows a terminal to read the content of the HS-PDSCH in the next TTI without loss of information.

The feedback information returned by the terminal, in particular for the acknowledgements of the HARQ protocol and for the measurements useful for the adaptive modulation, are transmitted by a dedicated up resource, on a channel dubbed DPCCH-HS ("Dedicated Physical Control Channel—High Speed").

On setting up the HS-DSCHs and HS-SCCHs, the Radio Network Controller (RNC) which supervises the base station (CRNC, "Controlling RNC") allocates it the corresponding code resources, per cell. By way of example, provision may be made to reserve a list of L=16 codes with spreading factor 128 for the HS-SCCHs.

According to the invention, when an HSDPA session is open (or reconfigured) for a given terminal, the CRNC tells it the list of HS-SCCH codes, L of them, allocated to the base station. This list is composed of several sets of K codes. This subdivision into sets of K codes can be imposed directly by the CRNC on the base station or form the subject of a negotiation between them through the so-called Iub interface standardized by the 3GPP.

To address HS-SCCH data blocks to a given terminal, the base station firstly selects a set of K codes and indicates same to the terminal. It then selects one of the K codes of this set as a function of the availabilities on the HS-SCCH TTI concerned. The number K of HS-SCCH codes per set is, for example, between 1 and 4 for each terminal. Hereinbelow it will be considered to be equal to 4, without restricting the generality of the account.

In a typical embodiment, a terminal continuously despreads the signal received by means of the K=4 HS-SCCH codes that have been indicated to it. However, to avoid needlessly invoking the resources of the terminal, it is judicious for the latter to decode only the HS-SCCH with which it is concerned, as appropriate. To do this, a specific signaling is provided on the down path, borrowing a dedicated channel (DPCH) operating in parallel with the HS-PDSCH for this terminal.

This specific signaling comprises a two-bit indicator called HI ("HS-DSCH Indicator"), carried by the DPCH and indicating to the terminal that information is destined for it on an identified HS-SCCH. The two bits of the HI define four states which make it possible to distinguish which of the four HS-SCCHs is carrying as appropriate the item of information relating to the terminal. If the HI is transmitted with zero power (this constituting a fifth state), none of the four HS-SCCHs is carrying any information relating to the terminal. In the latter case, a value may be allocated to the HI by the terminal which leads the latter to decode an HS-SCCH for nothing, but it becomes aware of this quickly since the HS-SCCH also indicates the destination terminal.

The HI destined for a terminal must be transmitted, read and interpreted by this terminal before the end of the first slot of the HS-SCCH, so that it is furnished in time with the information of the TFRI (HS-DSCH code allocated and modulation used) which are necessary to be able to demodulate an HS-PDSCH as appropriate.

A problem posed by the insertion of the HI into the stream transmitted on the DPCH is that its transmission rate is high and that its recovery by the terminal must be very fast. It is necessary to provide 5 transmissions per frame, i.e. $5 \times F_i$ transmissions per TTI of a dedicated transport channel corresponding to this DPCH, and the terminal cannot wait to have received a complete TTI to be decoded before knowing the values of these HIs. Consequently, the HI must be inserted for example after puncturing, or stealing, of QPSK symbols downstream of the second interleaver $30_j$.

Thus, the two bits of an HI form a QPSK symbol substituted, at the input of the modulator, for a symbol of the sequence to be transmitted. This substitution takes place in only some slots of the frame.

Returning to FIG. 2, a function of the module 100 is to manage the HSDPA functionality in the base station. In particular, it integrates the instance of the MAC protocol useful for the supervision of the HSDPA mode. This module controls the time-division multiplexing of the transport streams for the HS-DSCH channels of the cell, which is carried out, at a rate of one stream per terminal and per TTI on a given code, on the basis of the information streams received from the RNC by the multiplexing module 102 represented in FIG. 2. The signals sent on the corresponding physical channel or channels HS-PDSCH are spread and modulated in the block 3, by applying as appropriate the specified adaptive modulation scheme (modules 103), then combined by the module 84 with those of the other physical channels so as to be transmitted to the radio stage 4 and sent on the radio path, as explained previously.

The HSDPA management module 100 takes account of the feedback information UL returned by the terminals on the up path to organize the scheduling of the HARQ blocks and the adaptation of the modulation for each TTI of the HS-DSCH. The module 100 furthermore controls the transmission on the HS-SCCH channels. The corresponding signals are coded by the modules 105 on the basis of the information specified by the module 100 (identification of the terminals, TFRI, HARQ information, etc.). These signals are spread and modulated in the block 3 (modules 106), then combined by the module 84 with those of the other physical channels.

The HSDPA management module 100 also controls the transmission of the HI by stealing symbols on the QPSK symbol streams provided to the modulators of the DPCHs, before the latter are modulated in the block 3. The HI is inserted by means of a multiplexer 108 placed downstream of the multiplexing block 2, described previously with reference to FIG. 4, on the symbol stream relating to a PhCH used by the terminal.

For each user for which an HSDPA block is destined, the module 100 selects:

(1) one or more HS-PDSCH codes and a TTI shortly available on this code to receive the block;

(2) an HS-SCCH code, out of the K=4 possible codes for the user, having a TTI available two slots ahead of the TTI of the HS-PDSCH channels and hence in particular of that selected in step (1).

The module 100 then determines the information to be transmitted in the TTI available on the chosen HS-SCCH, and instructs the corresponding module 105 accordingly. Finally, it positions the HI as a function of the HS-SCCH code selected in step (2) and has this HI inserted into the symbols transmitted on the dedicated channel, with just enough lead in advance of the TTI of the HS-SCCH channel (for example at most one slot ahead).

The lower part of FIG. 3 shows the inverse operations performed in a receiver terminal. At the output of the demodulator 92 operating on the PhCH on which the HI is inserted, a demultiplexer 110 extracts the QPSK symbol corresponding to the HI at the appropriate instants and supplies it to an evaluation module 111. The latter instructs, as a function of the value of HI, a selector 112 so as to select one of the K=4 output streams from the despreading modules 94 of the block 7, to which the codes of the four HS-SCCHs usable for the terminal were allocated. Only the stream selected is then demodulated and decoded by the module 113 so as to obtain the signaling information transported by the HS-SCCH. This signaling information is supplied to a module 115 for managing the HSDPA mode in the terminal, which deduces therefrom the parameters necessary for the operation:

of the block 7 despreading module or modules 95 to which the HS-DSCH codes signaled on the HS-SCCH are allocated;

of the demodulation and decoding module 116 which receives the corresponding stream of despread symbols and which applies the appropriate reception processing by supplying the feedback information required (acknowledgement, etc.).

The HSDPA management module 115 formulates the UL signals to be returned on the up DPCCH to the base station of the cell on the basis of the feedback information obtained by the module 116. It also indicates to the despreading modules 94 which is the set of K=4 HS-SCCH codes usable among the list of L codes which was indicated to it by the Serving RNC (SRNC) for the setting up of the HSDPA session. This SRNC is often merged with the CRNC supervising the base station. It may, however, also be a separate RNC, communicating with the CRNC through the so-called Iur interface standardized by the 3GPP.

A stealing of bits at a fixed position every three slots so as to insert therein the symbol containing the HI may pose a problem of degradation of the signal carried by the DPCH channel after decoding by the terminal. The two deinterleaving steps $51_j$, $46_i$ performed in the terminal modify the position of the symbols $r'_j$ received in such a way that bits that are far apart in the slots transmitted may be clustered together after deinterleaving. This clustering means that there is a risk of having punctured several consecutive information bits (up to 4 bits), and therefore entails significant degradation of the performance of the channel decoding $43_i$.

Figure 6:
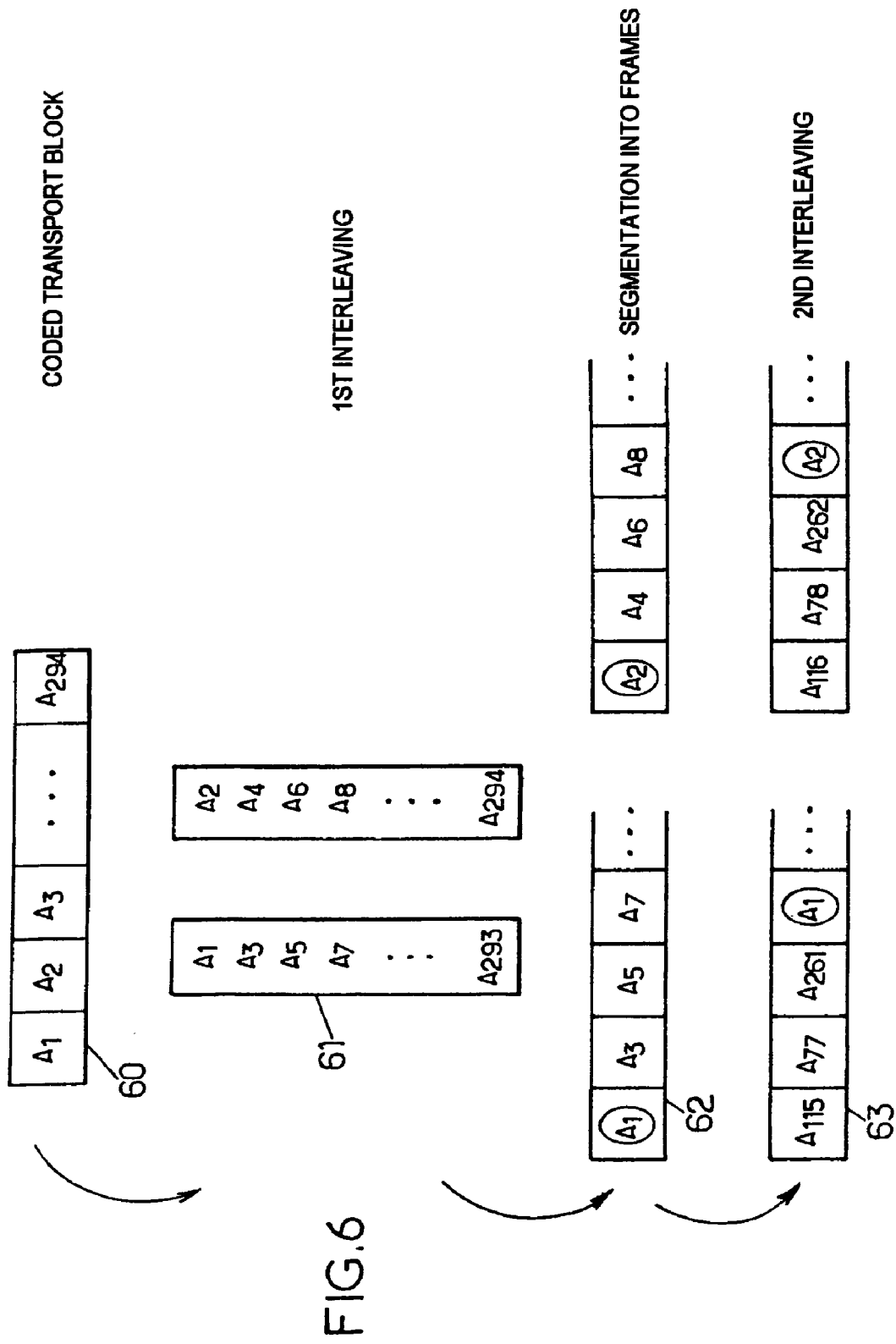
FIG. 6 is a simplified diagram indicating the manner of operation of the first interleaver in a UMTS radio network.

FIG. 6 shows an example of a transport block 60 containing 294 bits, denoted $A_1, A_2, A_3, \ldots, A_{294}$, after channel coding $23_i$ and bit rate adaptation $24_i$. In accordance with what was described earlier, the interleaving module $26_i$ in the base station performs an interleaving operation on this transport block 60. It amounts to writing row-wise in a two-column matrix 61 the sequence of bits of the transport block 60. The choice of the number of columns (two in the present case) is dependent on the TTI of the transport block 60. In the example set forth, a TTI of 20 milliseconds is considered, so that the transport block 60 will be divided into two when the stream of bits transmitted is put into frames ($F_i$=2). The interleaving carried out by the module $26_i$ then consists in reading the initial sequence of bits in the order of the columns of the matrix 61, beginning with the second column.

During the segmentation of the radio frames performed by the module $27_i$, frames 62 such as represented in FIG. 6 are thus obtained. The first frame of the TTI contains the odd bits of the initial sequence of bits of the transport block 60, whereas the second frame contains the even bits of this sequence of bits. It is therefore apparent in this figure that bits that are initially neighbors of the sequence contained in the block 60, such as $A_1$ and $A_2$, are located, after segmentation into frames, at identical positions in each of the two frames constructed. Thereafter, the permutation applied by the second interleaver $31_j$ is the same for each frame (independently of the details of this permutation), so that the two consecutive symbols $A_1, A_2$ will again be located at identical positions after this second interleaver $31_j$ (frames 63 in FIG. 6): they will then form part of QPSK symbols of like rank in two consecutive radio frames. If the QPSK symbol having this rank is lost on account of the insertion of an HI into the first frame, it will be likewise for that having the same rank in the next frame by reason of the puncturing performed at a fixed position 15 slots later, i.e. with a 5 TTI shift of the HS-SCCH. It is then seen that neither of the two consecutive symbols $A_1$, $A_2$ will be received by the terminal, thereby decreasing the performance of the decoder.

FIG. 6 therefore shows that, when $F_i>1$, the characteristics of the first interleaver $26_i$ are such that the substitution of the HI at fixed positions in the slots degrades the reception of the information on the dedicated channel.

Figure 7:
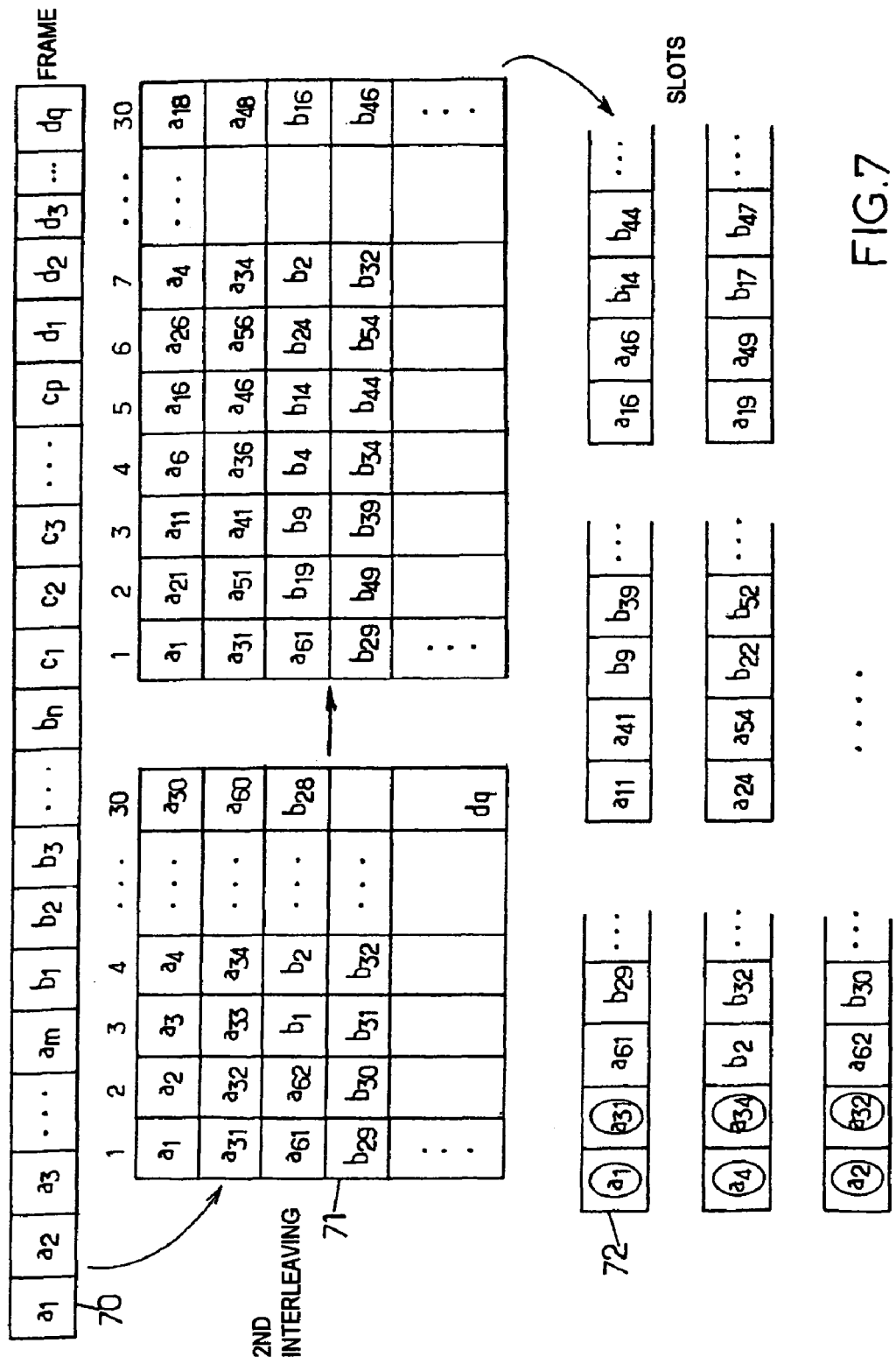
FIG. 7 is a simplified diagram indicating the manner of operation of the second interleaver in a UMTS radio network.

FIG. 7 actually illustrates the structure of the second interleaver $31_j$. FIG. 7 presents a frame 70 to be sent on a DPCH channel, which frame consists of information bits after multiplexing of the transport channels (and segmentation by PhCH if Y>1). This frame 70 is composed of several groups of bits, respectively arising from different transport channels (TrCH), concatenated by the module 28 of FIG. 4. These TrCHs correspond, for example, to categories of bits of variable significance, arising from a speech coder of AMR ("Adaptive Multi-Rate") type. It is thus possible to distinguish a first group of bits $a_1, a_2, a_3, \ldots, a_m$ pertaining to a TrCH A, a second $b_1, b_2, b_3, \ldots, b_n$ pertaining to a TrCH B, a third group of bits $c_1, c_2, c_3, \ldots, c_p$ pertaining to a TrCH C, and a fourth group of bits $d_1, d_2, d_3, \ldots, d_q$ pertaining to a TrCH D. The succession of these groups of bits results from the multiplexing of the transport channels by the module 28 within a frame of 10 milliseconds.

The intra-frame interleaving performed by the module $31_j$ amounts to writing the bits of the frame 70 row-wise into a matrix 71 of C2=30 columns. The module $31_j$ thereafter reads the matrix 71, column by column, after permuting the 30 columns of this matrix. The resulting stream of bits is thereafter positioned in the slots to be transmitted on the physical channels, at a rate of two bits per QPSK symbol. Since the number of columns of the matrix 71 (C2=30) is twice the number of slots per frame (N=15), the symbols of a slot correspond to two adjacent columns of the matrix after permuting the columns. The lower part of FIG. 7 shows the content of the first seven slots 72 of the frame in a case where there are m=62 bits in TrCH A. If a QPSK symbol of like position is punctured every three slots (for example the first symbol corresponding to the first two bits encircled in the lower part of FIG. 7), it may be seen that we almost always fall within the bits arising from the same TrCH, namely TrCH A in the example drawn, of which bits $a_1, a_{31}, a_4, a_{34}, a_2, a_{32}, a_5, a_{35}, a_{13}, a_{43}$ will be lost.

FIG. 7 therefore shows that the slots thus constructed do not allow random distribution of the bits as a function of their TrCH of origin. This results in a considerable misbalance of processing between the TrCHs, which can only degrade the quality of service.

Moreover, in the TrCH(s) thus disadvantaged, the probability of puncturing two neighboring bits in the output stream from the channel coder $23_i$ is increased. This negative effect is accentuated by that highlighted by the illustration of FIG. 6 when there are several frames in the TTI.

To alleviate these drawbacks, the position of the punctured symbols replaced by HIs is varied from one slot to another. This results in:

a better share-out of the punctured bits between the TrCHs when the PhCH comprises contributions from several TrCHs (cf. FIG. 7);

a better share-out of the punctured bits in the output stream from the channel coder $23_i$ when there are several frames per TTI, that is to say when $F_i>1$ (cf. FIG. 6).

A great number of choices of variable position of the symbols stolen in the frames and the slots may be made so as to comply with these criteria. For example, a circular permutation of the positions of the stolen symbols is performed on certain slots of each frame. Stated otherwise, the positions of five stolen symbols are the same from one frame to another, but are not applied to the same slots. In another example, the position of the stolen symbols is no longer preserved from one frame to another, but is translated by one symbol for each frame.

To signal to the terminal the set of K=4 HS-SCCH codes that the base station has selected for it, the latter also uses the dedicated channel. Nevertheless, this signaling information does not generally need to be updated as quickly as the HI.

By way of example, a modification of the selected set of K=4 HS-SCCH codes for a terminal may be made within the context of a reconfiguration of the internal, hardware and/or software, resources of the base station, in particular when the latter has a modular architecture.

Figure 8:
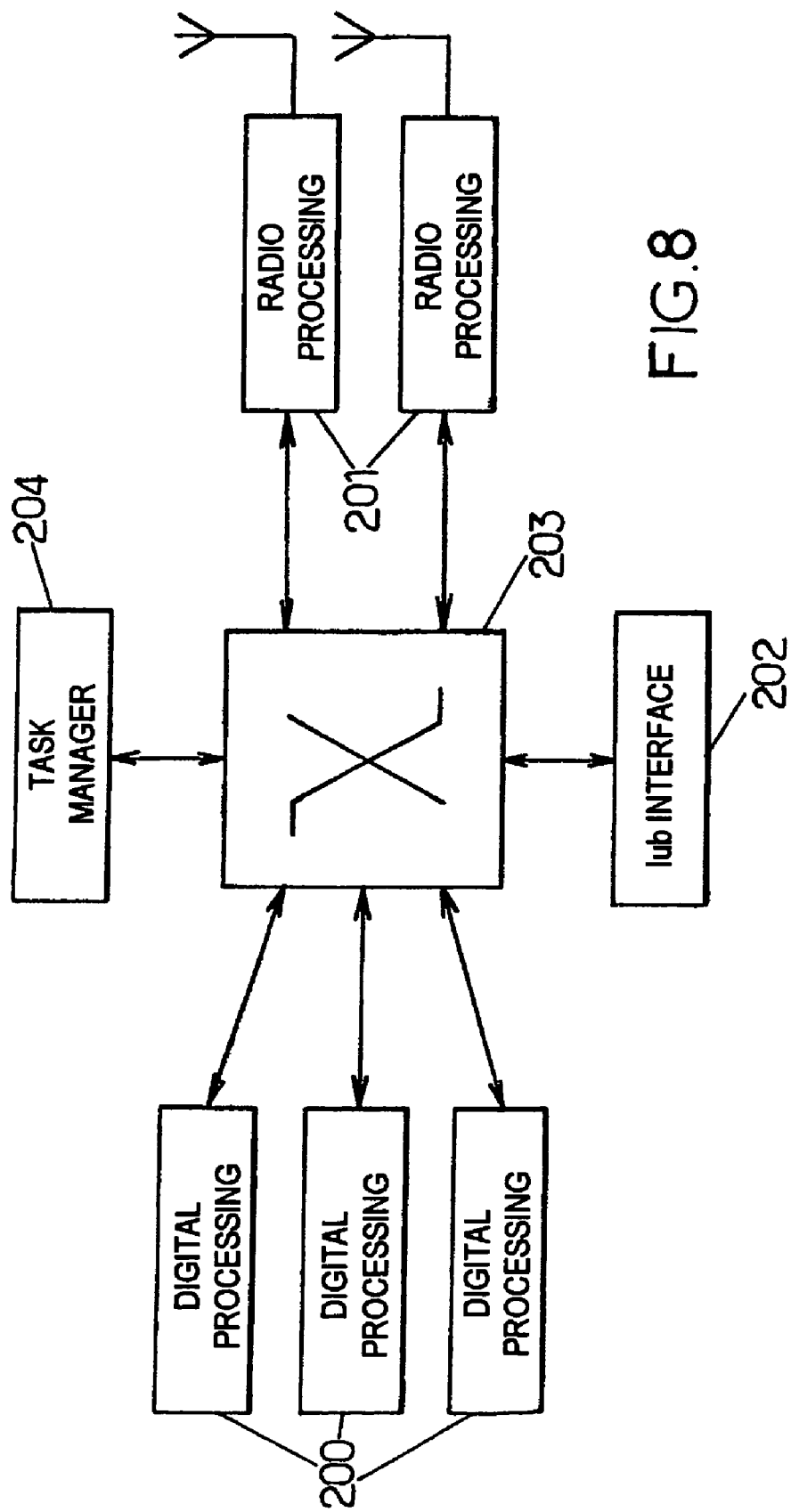
FIG. 8 is a diagrammatic representation of a base station with modular architecture.

FIG. 8 illustrates an exemplary hardware architecture of the base station. This architecture is modular as far as the digital processing carried out in the communication channels is concerned, in particular the coding and the multiplexing of the channels. In this example, the base station is composed of:

several modules 200 for digital processing of information streams (three modules in the example drawn), one of the main roles of which, for the dedicated channels, is to ensure the coding and the multiplexing of the transport stream and the shaping of the physical channels in the manner explained with reference to FIG. 4. Another role is to perform the spreading of the signals by the "channelization" and scrambling codes. For the up channels, the module 200 carries out the inverse processing of despreading, demodulation, demultiplexing and decoding;

one or more radio processing modules 201 (two modules in the example drawn) which shape the signals arising from the digital processing modules 200 and transpose them onto the carrier frequency, ensuring the radio processing required in order to feed one or more antennas. In the up direction, the module 201 carries out the inverse processing of filtering, transposition and digitization;

a module 202 for interfacing with the CRNC which supervises the base station. This module 202 operates in accordance with the Iub interface;

a switching platform 203 which steers the data streams between the modules 200, 201 and 202;

a task manager 204, conversing with the other modules through the switching platform 203, a main role of which is to share out all the processing to be performed between the various modules of the base station. The digital processing modules 200 are in particular assigned the transport channels, and the corresponding physical channels, with which they have to deal, by this task manager 204.

For the HSPDA functionality, one or more of the digital processing modules 200 must comprise the facilities 100-108 illustrated by FIG. 2, in particular the MAC instance (which may nevertheless be executed in part in the manager 204). Such a module 200 will therefore be assigned one or more HS-PDSCH codes and associated HS-SCCH codes by the manager 204. These HS-SCCH codes typically correspond to one of the sets of K codes from the list of L codes which was allocated to the base station by its CRNC. The HSDPA manager 100 of this module 200 will therefore make its selection of the HS-SCCH code, indicated by the HI, from among the set of K codes that has been assigned to this module 200.

In order to optimize the operation of the base station, it is desirable for the dedicated channel used to transmit the HI to a given terminal not to be processed by a different module 200 from that which carries out the HSDPA processing for this terminal (HS-SCCH and HS-DSCH). The same observation applies to the DPCCH-HS dedicated channel through which the terminal uploads the feedback information. Not taking this precaution leads to needless loading of the interfaces between the switching platform 203 and the modules 200 for exchanging information very quickly between various modules 200. More generally, it is preferable for all the channels relating to a given terminal to be processed by the same module 200. This makes it possible to reduce the processing times and the problems related to the synchronization of these processing operations.

In the illustration of FIG. 8, the digital processing modules 200 are hardware modules, consisting for example of one or more electronic cards each. It will be noted that the same problems arise if dealing with software modules, the interfaces that one wishes to avoid overloading then being software interfaces between processes.

To optimize the use of the processing resources in the base station, the manager 204 may therefore be induced to reassign the resources used for a given terminal, and in particular to toggle this terminal from one module 200 to another. This results in a transfer of the HSDPA MAC instance to another module 200 and in a modification of the HS-SCCH and HS-DSCH codes that will be used for the terminal. The modification of the HS-DSCH codes poses no problem since the latter are indicated explicitly in the TFRI transmitted on the HS-SCCH. On the other hand, the base station must inform the terminal of the modification of the set of K HS-SCCH codes.

Such a reassignment of the processing resources of the base station may be initiated by the task manager 204 as a function of the evolution of the load in the cell served, for example if the terminal concerned (or another terminal processed by the same module 200) needs extra resources that are no longer available in this module. In general, it will not be necessary to advise the CRNC or the SRNC of these channel reassignments.

The base station is initially informed by way of the Iub interface, by means of the NBAP protocol ("Node B Application Part", see technical specification 3GPP TS 25.433, Version 4.2.0, Release 4, published in Sep. 2001), of the list of L=16 HS-SCCH channels that is allocated to it by the CRNC. On setup of the HSDPA session with the terminal, the SRNC indicates this list to the terminal (that it has obtained through the Iur interface if it is not merged with the CRNC), by means of the RRC protocol ("Radio Resource Control", see technical specification 3GPP TS 25.331, Version 4.2.1, Release 4, published in Sep. 2001).

The indication of the set of K HS-SCCH channels to be taken into account by the terminal can a priori be effected at any moment determined by the base station. Here, the assumption is made that it is effected periodically. In this case, the new HS-SCCH channels may be used right from the next period of updating of this indication, which is here dubbed the period T. The period T in question depends on the periodicity with which one wishes to be able to perform the modification of the resources. It should be a multiple of three time slots of 666 µs, so as to be synchronized with the TTI of the HS-DSCHs and of the HS-SCCHs. In general, the management of the hardware and/or software resources of the base station does not require overly frequent modifications, so that it is not necessary to perform such a change and, hence, to indicate all the three time slots to the terminal.

By way of example, this period T may be fixed at 80 ms. The indication made to the terminal can request a simple transmission of the information during this period, this corresponding to the transmission of a small number of symbols, or else, preferably, a redundant transmission of this information, thereby increasing the number of information-carrying symbols that will be transmitted to the terminal during the period T. Examples of such coding will be described later.

During the current period T, the HSDPA manager 100 of the module 200 processing the channels associated with the terminal inserts an HSI indication of the HS-SCCH channels that will be used during the next period T. In the absence of reconfiguration of the resources of the base station, this indication designates the set of K=4 HS-SCCH codes managed in this module 200. In the presence of a reconfiguration of the resources leading to the terminal being transferred to another module 200 of the base station, this indication designates the set of K=4 HS-SCCH codes managed in this other module.

In our particular case where K=4 and L=16, the HSI indication may pertain to two bits. To take account of a certain number of possible typical cases, provision may be made for this indication to be represented on more bits, for example 5 bits.

The particular case where L=16 with disjoint sets of K=4 channels is merely an illustration of the invention. In practice, the sets making up the list of shared channels that is allocated to the base station may have the same number of channels K or numbers of channels that differ. They may also exhibit overlaps, certain codes of the list possibly belonging to several of these sets.

It will be observed that the method according to the invention can be applied to a control of shared communication channels used by a base station whose architecture is not necessarily modular. Other considerations may in fact cause one to search for the flexibility of channel management that affords the base station the ability to select the HS-SCCH codes assigned to a given terminal without being constrained by an allocation that the RNC would have made specially for this terminal. For example, it is conceivable to imagine that the list of HS-SCCH channels that is allocated to a base station should comprise several sets of channels having different spreading factors and that the base station should select one of these sets by taking account of the power control bits uploaded by the terminal to slave the transmission power to the HS-SCCH: if a high or low threshold of power is attained on the HS-SCCH, the base station could choose to vary the spreading factor on the next period T, and hence to change the set of HS-SCCH codes in the list which is allocated to it, without having to refer same to the CRNC or to the SRNC. The HSI makes it possible to signal such changes to the terminal.

In a first embodiment of the invention, the insertion of the HSI indication is performed by a symbol stealing mechanism similar to that described earlier in respect of the insertion of the HI, preferably after application of a redundant coding to this HSI indication.

The HSDPA manager 100 then supplies the symbols corresponding to the HSI, which the multiplexer 108 substitutes for determined symbols (FIG. 2) delivered by the multiplexing module 2 for a DPCH destined for the terminal. At the terminal level (FIG. 3), the demultiplexer 110 extracts from the stream of demodulated symbols received on this DPCH the symbols which correspond to the HSI and addresses them to an evaluation unit 120. The latter decodes the symbols extracted in the course of the period T, correcting any transmission errors, so as to recover the HSI addressed to the HSDPA manager 115, which assigns the corresponding codes to the despreading modules 94 for the next period T.

It should be noted that the HSI indication can be transmitted with or without the HI indication discussed previously. It is conceivable not to transmit the HI if the terminals can decode the K=4 HS-SCCH channels indicated by the HSI without this overly penalizing their electrical consumption. QSPK symbols can then be stolen on the DPCH so as to transmit the HSI rather than the HI.

If the HI is used, the positions of the symbols stolen, so as to insert therein the HSI the next period T, must take account of the position of the symbols stolen so as to insert therein the HI, so as to avoid degrading the performance of the transmission channel on account of the effect of the two interleavers, as explained with reference to FIGS. 6 and 7.

FIG. 9 shows an example of a function for distributing the stolen symbols in the case of a TTI of 40 ms ($F_i$=4) on the DPCH, the HI forming the subject of a theft of five QPSK symbols per frame, and the HSI forming the subject of a theft of one QPSK symbol per frame. It represents a table indicating, for the four frames indexed from 0 to 3, the index number of the QPSK symbols stolen in each slot transmitted by the base station. The stolen symbols for the HI in the first frame have respectively the positions 0, 3, 6, 9 and 12 in the slots numbered 0, 3, 6, 9 and 12. This prevents the problem mentioned above with reference to FIG. 7 in relation to the misbalance in the processing of the multiplexed TrCHs. For the next frame, a circular permutation is applied to these symbol positions, so that the symbols of positions 3, 6, 9, 12 and 0 are respectively stolen from slots numbered 0, 3, 6, 9 and 12. The same circular permutation is applied to determine the positions of theft from the following frames. This circular permutation prevents the problem eluded to above with reference to FIG. 6 in relation to the degradation in performance of the channel decoder due to the first interleaver when $F_i$>1. In the intermediate slots numbered 1, 2, 4, 5, 7, 8, 10, 11, 13 and 14, no QPSK symbol is stolen in this example. The position of the stolen symbols follows the same scheme as for the first four frames represented, for the next four frames. The HSI indication requires the stealing of one QPSK symbol per frame, which corresponds to 16 bits per 80 ms period T.

In the example of FIG. 9, the positions chosen for the stolen symbols have respectively index numbers 13, 1, 4 and 7 in slot 0 of each frame. The index numbers of these positions have been primed in the figure so as to distinguish them from the symbols stolen for the HI. The position of the stolen symbols follows the same scheme as for the first four frames represented, for the next four frames. Thus, all the symbols stolen, whether for the HI or for the HSI, have different positions for one and the same slot in successive frames, thereby preventing the problem of the first interleaver set forth above. Furthermore, the positions of all the stolen symbols vary likewise from one slot to the next in one and the same frame, so that one is forearmed against the negative effects of the second interleaver.

As a variant, the symbols stolen for the HSI are in a time slot of the frame which has not formed the subject of a symbol stealing for the HI, for example in slot 1 in the illustration of FIG. 9.

The same pattern of the positions of substitution of the symbols representing the HSI may be applied if the HI is not transmitted.

Preferably, the QPSK symbols corresponding to the HSI and/or to the HI, are sent by the base station with a greater transmission power than the other information symbols. In this case, the destination terminal can read these symbols reliably before decoding the information streams received, while limiting the risk of error. However, the increase in the power for these symbols is not indispensable, especially in the case where the HSI is transmitted with a redundant coding.

Various codings of the HSI information are conceivable and result in a greater or lesser number of symbols to be stolen in the symbol stream carried by the DPCH channel dedicated to the terminal. It is conceivable to transmit the indication in a raw manner, that is to say without redundancy. In this case, a small number of symbols is sufficient for a period T.

Preferably, the HSI is coded in such a way as to make its reception by the terminal reliable.

In a particular embodiment, the HSI indication may be represented by 5 bits before coding, and this item of information is coded in such a way that it forms the subject of one symbol per radio frame over a period T of 80 ms. In this case, the number of bits to be stolen on the stream of the DPCH corresponding to the period T is 16 (=8 frames×2 bits for a QPSK symbol). A possible coding is the bi-orthogonal coding (16,5) described in Section 4.3.3 of the aforementioned technical specification 3G TS 25.212. A theft of 16 bits is therefore carried out according to this coding by the base station, for example in the positions illustrated in FIG. 9. The evaluation module 120 of the terminal decodes the 16 information-carrying bits and deduces therefrom the HSI designating the set of HS-SCCH selected, that it may possibly have to read at the next period T.

The same coding can be used for the HSI by stealing two QPSK symbols per radio frame over a period T of 40 ms, which corresponds to 16 bits (=4 frames×2×2 bits per QPSK symbol), with or without additional stealing for the HI.

If one wishes to transmit the HSI at a rate of two symbols per frame over a period T of 80 ms, it is possible to use a coding of the item of information on 32 bits (=8 frames×2×2 bits per QPSK symbol). The bi-orthogonal coding (32,10) described in Section 4.3.3 of the aforementioned technical specification 3G TS 25.212 may meet this need.

If the HI is not transmitted, it is also conceivable to code the HSI at a rate of one symbol per HSDPA TTI (TTI of the HS-DSCH and of the HS-SCCHs), that is to say every 2 ms. For a frame, this corresponds to a total of 10 bits (=10/2×2 bits per QPSK symbol). If the HSI before coding requires only 3 bits, it is possible to use a (10,3) coding, such as for example that described in the technical report 3G TR 25.870, Version 1.1.0, published in Nov. 2001 by the 3GPP. By way of example, the positions of the 5 QPSK symbols stolen in a frame may be those indicated for the HI in FIG. 9.

When the HI is transmitted, it should be taken into account during the symbol stealing carried out on the DPCH concerned to transmit the HSI. Having regard to the small stealing period for the HI (one symbol per HSDPA TTI, i.e. 2 bits every 2 ms), the coding of the HSI is preferably done on a small number of bits. It can, for example, be transmitted by stealing one symbol every 2 radio frames over a period T of 80 ms, which corresponds to 8 (=80/(10×2)×2) stolen bits over a period of 80 ms. For this purpose and if the HSI requires only 2 bits before coding, it is possible to use a (7,2) coding such as described in the aforementioned technical report 3G TR 25.870, and one repeating one of the seven coded bits.

The aforementioned (16,5) coding within the context of a stealing of one symbol per frame over a period of 80 ms may also be used for the HSI advantageously in the presence of the HI, since the period of such stealing is small enough not to significantly degrade the performance of the reception chain.

The example may also be cited of a stealing of one symbol every two HSDPA TTIs for the HSI in the presence of the HI. This corresponds to a stealing of 20 bits over a period T of 40 ms (i.e. 40/(2×2)×2). In this case, a (10,3) coding such as eluded to above may be used, each coded bit being repeated once. For a period T of 80 ms, the same (10,3) coding is suitable, each coded bit being repeated three times.

In a second embodiment of the invention, the insertion of the HSI indication onto the dedicated down channel is performed through the intermediary of a specific coding of a data field present on the DPCCH of this dedicated channel. This field is typically that reserved for the transmission of the TFCI. The TFCI is transmitted to the terminal at the rate of a few bits per 666 μs slot over the duration of a 10 ms radio frame, with a redundant coding to protect it against transmission errors. It is possible to add possible states on input to this coding so as to transmit an additional item of information. For example, by doubling the number of states, it is possible to insert a signaling bit per frame, which can be utilized to transmit the HSI over a period T of n frames if the HSI is composed of n bits.

This second embodiment of the invention also allows the transmission of the HSI either alone or accompanied by an HI transmitted by the above symbol stealing mechanism.

Of course, the invention is not limited to the cases of application described above by way of illustration. The method according to the invention is moreover applicable to systems other than HSDPA or UMTS.

The invention claimed is:

1. A method of controlling communication channels between a base station and terminals, including channels that are shared by the terminals so as to communicate with said base station and at least one channel of the base station that is dedicated to one of the terminals, the method comprising the following steps:
  allocating a list of shared channels, which list is composed of several sets of shared channels, to the base station;
  for a communication session between the base station and said terminal, indicating to the terminal, from a control facility, the list of shared channels that is allocated to the base station; and
  at the base station level, selecting for the terminal one of the sets of shared channels and, independently of the control facility, indicating the selected set to the terminal by way of said dedicated channel.

2. The method as claimed in claim 1, in which the selection of one of the sets of shared channels for the terminal is made in response to a command for configuration of processing resources in the base station.

3. The method as claimed in claim 2, in which said processing resources of the base station comprise several modules to which are assigned processings relating to groups of channels respectively associated with said modules, and in which each set of shared channels that is used by the base station is included in the group associated with one of the modules 4. The method as claimed in claim 3, in which the set of shared channels that is indicated to the terminal is selected by the base station in such a way as to form part of the same group of channels, which is associated with one of the modules, as said dedicated channel.

5. The method as claimed in claim 4, in which the set of shared channels that is indicated to the terminal is selected by the base station in such a way as to form part of the same group of channels as each dedicated channel set up with said terminal.

6. The method as claimed in claim 1, in which said list of shared channels that is allocated to the base station is composed of channels for signaling from the base station to the terminals.

7. The method as claimed in claim 6, in which said shared channels furthermore comprise at least one channel for traffic from the base station to the terminals, and in which the shared signaling channels of the allocated list are intended to transmit information serving for the reception by the terminals of the traffic carried by the shared traffic channels.

8. The method as claimed in claim 1, in which said selected set is indicated to the terminal in a redundant manner.

9. The method as claimed in claim 1, in which said dedicated channel carries a stream of symbols destined for the terminal and in which said selected set is indicated to the terminal by modifying the value of at least one symbol of said stream.

10. The method as claimed in claim 9, in which said selected set is indicated to the terminal periodically.

11. The method as claimed in claim 9, in which the base station furthermore comprises at least one module for interleaving symbols transmitted on said dedicated channel, acting over an interleaving period, in which, after interleaving, the value is modified of at least two symbols of said stream of symbols within an interleaving period, and in which the position of said symbols is chosen in such a way that symbols corresponding to said symbols before interleaving are dispersed among the stream of symbols.

12. The method as claimed in claim 9, in which a second item of information is indicated to the terminal periodically, by modifying the value of at least one symbol of said stream carried by the dedicated channel, in which the position of the symbols whose value is modified is chosen, whether for the indication to the terminal of said selected set or of said second item of information, in such a way that symbols corresponding to said symbols before interleaving are dispersed among the stream of symbols.

13. The method as claimed in claim 12, in which said second item of information comprises an identifier of at least one of the shared channels of said selected set.

14. The method as claimed in claim 9, in which the symbols whose value is modified are transmitted with a greater transmission power than the other symbols of the stream of symbols over said dedicated channel.

15. The method as claimed in claim 1, in which the sets making up the list of shared channels that is allocated to the base station have the same number of channels.

16. The method as claimed in claim 1, in which some at least of the sets making up the list of shared channels that is allocated to the base station have numbers of channels that differ.

17. The method as claimed in claim 1, in which the sets making up the list of shared channels that is allocated to the base station are disjoint.

18. The method as claimed in claim 1, in which some at least of the sets making up the list of shared channels that is allocated to the base station have channels in common.

19. A base station for a system for communicating with terminals, comprising: means for obtaining, in conjunction with a control facility, a list of shared channels that is allocated to the base station and that has been communicated to one of said terminals from said control facility, wherein said list is composed of several sets of shared channels; means for selecting, for said one of the terminals, one of the sets of shared channels; and means for indicating to said terminal by way of a dedicated channel, independently of the control facility, which set is selected from the list allocated to the base station.

20. The base station as claimed in claim 19, comprising several modules to which are assigned processings relating to groups of channels respectively associated with said modules, and in which each set of shared channels that is used by the base station is included in the group associated with one of the modules.

21. The base station as claimed in claim 20, in which the means of selecting the set of shared channels that is indicated to the terminal are devised so that said set is included in the same group of channels, that is associated with one of the modules, as said dedicated channel.

22. The base station as claimed in claim 21, in which the means for selecting the set of shared channels that is indicated to the terminal are devised so that said set is included in the same group of channels as each dedicated channel set up with said terminal.

23. The base station as claimed in claim 19, in which said list of shared channels that is allocated to the base station is composed of channels for signaling from the base station to the terminals.

24. The base station as claimed in claim 23, in which the shared signaling channels of the allocated list are intended to transmit information serving for the reception by the terminals of traffic carried by shared channels for traffic from the base station to the terminals.

25. The base station as claimed in claim 19, in which the means for indicating the selected set to the terminal are devised so as to indicate said selected set in a redundant manner.

26. The base station as claimed in claim 19, in which said dedicated channel carries a stream of symbols destined for the terminal, and in which the means for indicating the selected set to the terminal are devised so as to indicate said selected set by modifying the value of at least one symbol of said stream.

27. The base station as claimed in claim 26, comprising means for periodically indicating said selected set to the terminal.

28. The base station as claimed in claim 26 or 27, furthermore comprising at least one module for interleaving symbols transmitted on said dedicated channel, acting over an interleaving period, means for modifying, after interleaving, the value of at least two symbols of said stream of symbols within an interleaving period, and means for choosing the position of said symbols in such a way that symbols corresponding to said symbols before interleaving are dispersed among the stream of symbols.

29. The base station as claimed in claim 26, comprising means for periodically indicating a second item of information to the terminal, by modifying the value of at least one symbol of said stream carried by the dedicated channel, and means for choosing the position of the symbols whose value is modified, whether for the indication to the terminal of said selected set or of said second item of information, in such a way that symbols corresponding to said symbols before interleaving are dispersed among the stream of symbols.

30. The base station as claimed in claim 29, in which said second item of information is an identifier of at least one of the shared channels of said selected set.

31. The base station as claimed in claim 26, comprising means for transmitting the symbols whose value is modified with a greater transmission power than the other symbols of the stream of symbols over said dedicated channel.

32. A terminal for a communication system comprising at least one base station and a control facility and using channels shared with other terminals to communicate with the base station and at least one dedicated channel from the base station to said terminal, the terminal comprising:
  means for receiving from the control facility a list of shared channels that is allocated to the base station, and is composed of several sets of shared channels, for a communication session with the base station; and
  means for receiving from the base station, by way of said dedicated channel, an indication of one of the sets of shared channels that is selected by the base station for said terminal.

33. The terminal as claimed in claim 32, in which said list of shared channels is composed of channels for signaling from the base station to said terminal and to the other terminals.

34. The terminal as claimed in claim 33, in which said shared channels furthermore comprise at least one channel for traffic from the base station to said terminal and to the other terminals, and in which the shared signaling channels of the allocated list are designed to transmit information serving for the reception by the terminals of the traffic carried by the shared traffic channels.

35. The terminal as claimed in claim 32, in which said selected set is received in a redundant manner.

36. The terminal as claimed in claim 32, in which said dedicated channel carries a stream of symbols destined for the terminal and comprising means for deducing right from the receipt of said stream, said selected set by extracting at least one symbol having a predetermined position in the stream of symbols received.

37. The terminal as claimed in claim 36, furthermore comprising at least one module for deinterleaving symbols received on said dedicated channel, acting over a deinterleaving period, and means for extracting, before deinterleaving, at least two symbols belonging to distinct time slots separated by a fixed period of said stream of symbols within an interleaving period, said extracted symbols having a variable predetermined position between two successive time slots containing said symbols.

38. The terminal as claimed in claim 36, furthermore comprising means for receiving a second item of information with a stealing period and means for extracting at least two symbols from said stream carried by the dedicated channel, whether for the indication to the terminal of said selected set or of said second item of information, said extracted symbols having a predetermined position.

39. The terminal as claimed in claim 38, in which said second item of information is an identifier of at least one of the shared channels of said selected set.

* * * * *